United States Patent
Schuelke et al.

(10) Patent No.: US 6,425,585 B1
(45) Date of Patent: Jul. 30, 2002

(54) PROCESS AND SYSTEM FOR STABILIZING VEHICLES AGAINST ROLLING

(75) Inventors: Armin Schuelke, Renningen; Armin-Maria Verhagen, Schwieberdingen; Roland Stoller, Fellbach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,278

(22) PCT Filed: Mar. 27, 1999

(86) PCT No.: PCT/DE99/00930
§ 371 (c)(1),
(2), (4) Date: May 22, 2000

(87) PCT Pub. No.: WO99/67100
PCT Pub. Date: Dec. 29, 1999

(30) Foreign Application Priority Data

Jun. 25, 1998 (DE) .......................... 198 28 339
Oct. 8, 1998 (DE) .......................... 198 46 275

(51) Int. Cl.⁷ .............................................. B60G 17/01
(52) U.S. Cl. ........................... 280/5.511; 280/124.106; 280/124.149
(58) Field of Search .................... 280/5.511, 124.106, 280/124.13, 124.149, 124.152

(56) References Cited

U.S. PATENT DOCUMENTS

| 4,660,669 A | | 4/1987 | Yasuo ................... 180/444 |
| 4,796,911 A | * | 1/1989 | Kuroki et al. ............. 280/689 |
| 4,892,329 A | * | 1/1990 | Kozaki et al. ............. 280/772 |
| 4,919,444 A | * | 4/1990 | Leiber et al. ............. 280/707 |
| 4,962,943 A | * | 10/1990 | Lin ....................... 280/707 |
| 5,161,822 A | * | 11/1992 | Lund ..................... 280/772 |
| 5,178,406 A | * | 1/1993 | Reynolds ................. 280/723 |
| 5,186,486 A | * | 2/1993 | Hynds et al. ............. 280/689 |
| 5,217,245 A | * | 6/1993 | Guy ...................... 280/689 |
| 5,431,431 A | * | 7/1995 | Fulks et al. ............. 280/721 |
| 5,882,017 A | * | 3/1999 | Carleer .................. 280/5.508 |
| 6,022,030 A | * | 2/2000 | Fehring .................. 280/5.511 |

FOREIGN PATENT DOCUMENTS

| DE | 30 48 532 | 7/1982 |
| EP | 0292 567 | 11/1988 |
| FR | 195 00 869 | 7/1995 |
| JP | 62 221909 | 9/1987 |
| JP | 02 270617 | 11/1990 |
| JP | 04 027615 | 1/1992 |
| JP | 06 032134 | 2/1994 |
| JP | 08 085328 | 4/1996 |

OTHER PUBLICATIONS

Konstruktion und Elektronik, No. 17, p. 9, Aug. 5, 1992.

\* cited by examiner

Primary Examiner—Eric Culbreth
Assistant Examiner—L. Lum
(74) Attorney, Agent, or Firm—Kenyon & Kenyon (57) ABSTRACT

A system for roll stabilization of vehicles, in particular motor vehicles, is described, where actuating arrangements are provided. At least one sensor detects a roll parameter, and at least one slewing drive is arranged between halves of the front and/or rear chassis stabilizer, thus creating an initial stress of the stabilizer halves to reduce or suppress the rolling motion and, in the event of roll, applying a counter-torque to the vehicle body as a function of output signals of the sensor. The slewing drive is an electromechanical slewing drive and includes an arrangement for locking the swiveling of the stabilizer halves with respect to one another.

19 Claims, 6 Drawing Sheets

PROCESS AND SYSTEM FOR STABILIZING VEHICLES AGAINST ROLLING

BACKGROUND INFORMATION

The present invention relates to a system and a method of roll stabilization of vehicles, in particular motor vehicles, where a controlling arrangement having at least one sensor for detecting a roll quantity and at least one slewing drive arranged between the two halves of the front and/or rear vehicle stabilizer, producing an initial stress in the stabilizer halves to reduce or suppress the rolling motion and, in the event of a roll, applying a counter-torque to the vehicle body as a function of sensor output signals.

A system and method relating to roll stabilization of vehicles is generally described in *Konstruktion und Elektronik,* no. 17, page 9, Aug. 5, 1992.

With such a system, a counter-torque is applied to the body by a suitable adjustment spring to suppress the rolling motion of the vehicle body when turning a corner. This torque is preferably produced on the stabilizers of the front and rear axles. The conventional stabilizers designed as torsion bar springs are disconnected, and a slewing drive which can generate an active torsion and thus an initial stress of the stabilizer halves is arranged between the two stabilizer halves. With the help of such a system, both driving performance and driving comfort are improved, i.e., the rolling motion of the vehicle body is reduced or suppressed while the right and left sides of the vehicle are uncoupled in the event of one-sided roadway effects.

The known system mentioned above uses a hydraulic actuator. Such a hydraulic actuator needs special installations in the vehicle which are sometimes expensive, e.g., extensive pipework. Power is still expended even when driving in a straight line and in quasi-steady states of the vehicle, depending on the design of the pressure supply, so that no-load pump losses occur even when driving in a straight line. Hydraulic systems installed in a vehicle also have the disadvantage that hydraulic fluid which is an environmental pollutant can escape when there is a leak in the system, e.g., due to an accident.

SUMMARY OF THE INVENTION

In view of the preceding discussion, an object of the present invention is to make possible a purely electromechanical system design for roll stabilization that will yield a reduction in the required power in steady-state or quasi-steady-state driving maneuvers while also reducing costs in comparison with the known hydraulic designs.

Based on such an electromechanical system for roll stabilization according to the present invention, a method according to the present invention should make it possible to achieve a reduced rolling motion in comparison with a passive vehicle even outside the control range.

According to an aspect of the present invention, a generic system for roll stabilization of vehicles that achieves the object defined above is characterized in that the slewing drive is an electromechanical slewing drive and has an arrangement for locking swiveling of the stabilizer halves with respect to one another.

The roll stabilization system according to the present invention permits simple installation in the vehicle because it has a simple electromechanical control unit. Environmental safety and installation costs are improved in comparison with a hydraulic system. The roll stabilization system according to the present invention does not require any power when driving in a straight line because in that case there are no hydraulic pump losses.

Due to the preferred use of a brake that is applied or released electromagnetically for locking, it is possible to lower the required power in steady-state or quasi-steady-state driving maneuvers and to reduce the thermal load on the electric motor. When the brake is applied, overload protection is achieved, permitting slippage when the torque is too high and thus protecting the parts.

Furthermore, the electromechanical slewing drives mounted on the front and rear axles also permit a reduction in the rolling motion above the controllable torques when the brake is applied.

Use of brakes that are applied or released electromagnetically depends on the system failure strategy employed. With brakes that are applied electromagnetically, the stabilizer halves on the front and rear axles are separated in a system failure. The rolling behavior and self-steering behavior are thus determined only by the conventional spring and shock absorber elements.

With electromagnetically released brakes, suitable measures must that the electromechanical actuator on the front and rear axles can be locked only in the middle position in a system failure to prevent inclination of the vehicle body in driving in a straight line. The stabilizer halves locked with respect to one another in this way then act like passive torsion bar springs. The rolling and self-steering behavior are determined through the choice of torsional rigidity.

An additional improvement in comfort can be achieved by using a clutch between the drive end and the output end of the actuator. Depending on the arrangement of the clutch, the electric motor and/or the gear or individual gear stages can be separated from the output end of the control unit, and the decoupling of the right and left sides of the vehicle can be improved by the resulting reduction in the moments of inertia. Depending on the design, a separate brake and/or clutch or a corresponding brake-clutch combination may be used.

A transverse acceleration sensor may be used to advantage as a sensor to detect a roll parameter of the vehicle. In addition, a sensor may also be provided to detect the steering wheel angle and another sensor may be provided to detect the vehicle speed.

The sensor(s), the electromechanical actuator and the brakes are advantageously each connected to an electronic control unit to generate corresponding control signals for the electromechanical slewing drive and the brakes as a function of the signals delivered by the sensors with the help of preset algorithms or learning algorithms executed in the electronic control unit.

The method using the roll stabilization system according to the present invention for roll stabilization of vehicles is characterized by the following steps:

I. Determining the maximum settable torque from the parameters:
   maximum motor torque of the electric slewing motor,
   gear reduction,
   efficiency and
   torque loss;

II. Determining the required actuating torque;

III. Releasing the brake and applying the torque to the low-torque end of the slewing motor when the required actuating torque is below the maximum actuating torque;

IV. Applying the brake when the required actuating torque exceeds the maximum actuating torque of the slewing drive, and V. Generating setpoint currents for the electric motors to generate a counter-torque for roll stabilization.

The roll stabilization system according to the present invention can also be used for certain leveling and inclination effects of the vehicle body when the vehicle is stationary and for raising and lowering individual wheels. The following applications can be implemented in particular:

Manual or automatic leveling of a vehicle about its longitudinal axis by suitably energizing the slewing drives and locking by applying the brakes, e.g., a vehicle standing on a slope or a camper trailer or the like standing on a curb at one side;

Manual or automatic leveling of a vehicle about its longitudinal axis when the vehicle is standing with a single wheel in a depression;

Use of the roll stabilization system as an entry or exit aid with facilitated opening and closing of the door due to a certain inclination of the vehicle body;

Use of the roll stabilization system for simpler loading of a roof luggage rack, a bicycle rack, etc. by inclining the body while the longitudinal axis remains horizontal;

Use of the roll stabilization system for lifting individual wheels, e.g., for changing a tire, by diagonal displacement of the front and rear slewing drives;

Use of the roll stabilization system for a defined inclination of the vehicle body or for lifting individual wheels through appropriately energizing the slewing drives and then locking the brakes, e.g., so that objects beneath the vehicle can be removed more easily or to create accessibility to the underbody of the vehicle, e.g., for repair work.

DETAILED DESCRIPTION

Figure 1:
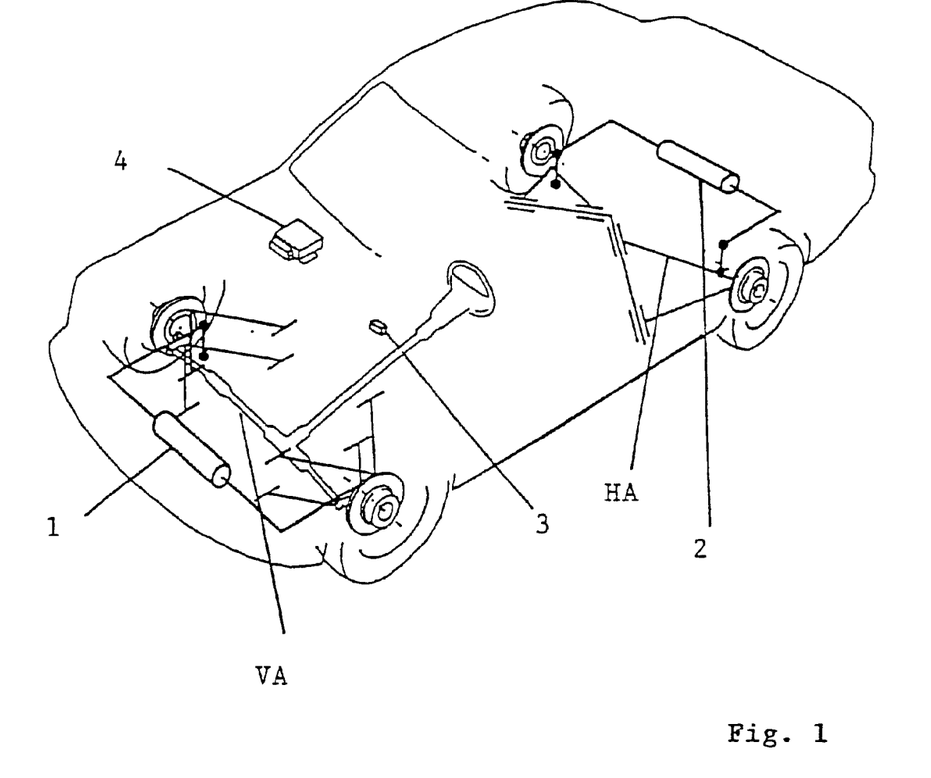
FIG. 1 schematically shows a motor vehicle using the roll stabilization system according to the present invention.

In the motor vehicle (PKW) diagramed in FIG. 1, a first electromechanical slewing drive 1 is arranged between the right and left halves of a torsion bar provided for front axle VA and a second electromechanical slewing drive 2 between the right and left halves of a torsion bar provided for rear axle HA. A sensor 3 is, for example, a transverse acceleration sensor for detecting the transverse acceleration of the motor vehicle. Furthermore, a control unit 4 mounted in the vehicle is connected by connecting lines (not shown) to sensor 3 and to electromechanical slewing drives 1 and 2. The electromechanical slewing drives built into the torsion bar of front axle VA and the torsion bar of rear axle HA produce an active twisting and thus an initial stress on the respective stabilizer halves. The initial stress torque generated in the stabilizers is supported by the right and left wheel suspension and by the vehicle body via the bearings. The forces applied to the body by the bearings then generate the torque required for roll stabilization.

Of course, in addition to the transverse acceleration signal generated by sensor 3, a sensor that determines a steering angle value and the driving speed or some other value to be processed to control the slewing drives may also be provided.

Figure 2:
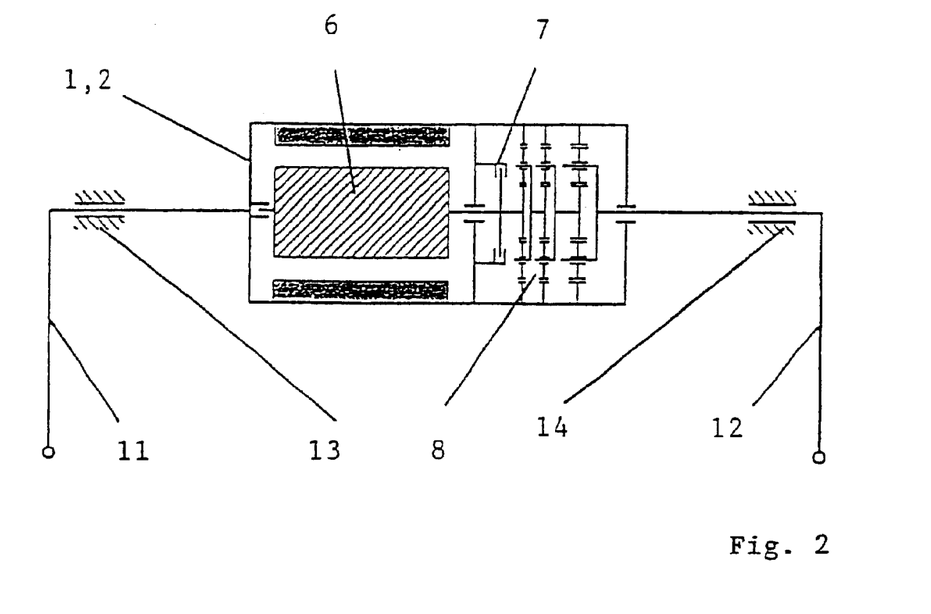
FIG. 2 schematically shows the electromechanical slewing drive according to the present invention arranged between a right and left stabilizer half.

FIG. 2 schematically shows a diagram of electromechanical slewing drives 1 and 2 for generating the initial stress torques. This slewing drive includes three basic components, namely an electric motor 6, a step-down gear 8 and a brake 7 in between them.

The torque generated by electric motor 6 is converted by step-down gear 8 into the torque needed for the initial stress of the stabilizers. One stabilizer half 11 is via bearing mount 14 connected directly to the casing of the electromechanical slewing drive 1 or 2 and the other stabilizer half 12 is connected to the output end (high torque end) of step-down gear 8 and is mounted in a bearing mount 14.

As mentioned, electric motor 6 and brake 7 are driven by control unit 4 (shown in FIG. 1) and by power electronics connected to it and in turn receiving the proper control signals from control unit 4.

With steady-state or quasi-steady-state driving maneuvers, i.e., when there is little or no change (i.e., as detected by the sensors) in the torque required to stabilize the vehicle body, brake 7 arranged on the low-torque side of gear 8 or on the motor shaft of electric motor 6 according to FIG. 2 can be applied and then electric motor 6 can be turned off. In this way, the power required for the holding torque is either minimized or reduced to zero, depending on the design of brake 7, and thus the thermal load on electric motor 6 is reduced.

If the sensors detect a transition from steady-state operation to non-steady-state operation, the torque acting on electric motor 6 immediately before brake 7 is applied is to be set again and then brake 7 is to be released. This torque is preferably set by preselecting the setpoint for the motor current which was set immediately before applying the brake. With a knowledge of the instantaneous torque acting in the stabilizer before releasing brake 7, the value stored before applying brake 7 may optionally be corrected to obtain the smoothest possible transition between the "brake applied" status and the "brake released" status.

Various designs and principles may be used for individual components 6, 7 and 8 and of electromechanical control drive 1, 2:

For example, electric motor 6 may be a
permanent field or externally excited d.c. motor (with mechanical or electronic commutation);
reluctance motor;
traveling wave motor;
stepping motor;
synchronous or asynchronous motor;
split field motor.
Step-down gear 8 may be in particular a
single-stage or multi-stage planetary gear, coupled gear or differential gear (cycloid gear, harmonic drive, Wolfrom gear, . . . ).
Brake 7 may be an electromagnetically released brake or an electromagnetically applied brake.

With the help of brake 7, the power required in steady-state and quasi-steady-state driving maneuvers can be reduced, and the thermal load on the electric motor can also be reduced. When applied, the brake forms an overload protection, thereby permitting slipping when the torque is too high and thus protecting the parts/components. In addition, brake 7 when applied reduces the rolling motion above the torques that can be controlled with electric motor 6.

When using a brake that is applied electromagnetically, the stabilizer halves on the front and rear axles are separated in the event of a system failure. The rolling and self-steering behavior are thus determined only by the conventional spring and shock absorber elements.

With a brake 7 that is released electromagnetically, suitable measures ensure that the actuators on the front and rear axles can be locked only in the middle position in the event of a system failure, to thereby prevent an inclined position of the vehicle body when driving in a straight line. Stabilizer halves 11, 12 locked with respect to one another in this way then act like passive torsion block springs. The rolling and self-steering behavior is determined by the choice of the torsional rigidity of the torsion bar springs.

Comfort can be further improved by an additional clutch (not shown in FIG. 2) between the drive end and the output end of the electromechanical slewing drive shown in FIG. 2.

Depending on the arrangement of the clutch, electric motor 6 and/or step-down gear 8 or individual gear stages thereof can be separated from the output end of control unit 1, 2 without any other components, and the separation between the right and left sides of the vehicle can be reduced by the resulting reduction in moment of inertia. Depending on the design, a separate brake and/or clutch or a corresponding brake-clutch combination may be used.

If decoupling between the right and left sides of the vehicle is achieved through other measures, such as the use of stabilizer halves having a low torsional rigidity, it is also possible as an alternative to a brake to use a load torque blocking device (an automatically switching double-action freewheeling diode) arranged between electric motor 6 and gear 8 to prevent an external torque (e.g., applied by the vehicle body) from twisting stabilizer halves 11, 12 relative to one another thus absorbing the holding torques.

As an alternative to the load torque blocking device, gear 8 or individual gear stages may be designed to be self-locking, in order to support externally applied torques and prevent twisting of the stabilizer halves.

On the basis of the electromechanical system for roll stabilization system according to the present invention, a control algorithm is described below which also permits a reduced rolling motion in comparison with a passive vehicle even outside the control range of the electromechanical control drive. In addition, the desired rolling torque distribution is guaranteed as long as the actuator of one axle has not reached the manipulated variable restriction.

The maximum adjustable torque is determined by the maximum motor torque and the prevailing gear reduction ratio, taking into account efficiencies and additional torque losses. If the required actuating torque is below the maximum actuating torque, holding brake 7 is released, and the torque on the low-torque side of gear 8 is taken up by electric motor 6. If the required torque on one axle VA, HA exceeds the maximum value, brake 7 is applied and the torque is taken up by brake 7. With a further increase in transverse acceleration and thus when there is a rolling motion of the vehicle body, stabilizer halves 11, 12 function as in the passive case and can absorb an additional torque, which ensures that the rolling motion is smaller than in the passive case even when the maximum actuating range is exceeded.

Without a corresponding holding brake 7, motor 6 would be reversed by the external torque applied by the body motion when the maximum actuating range is exceeded without taking up any additional torque.

Figure 3:
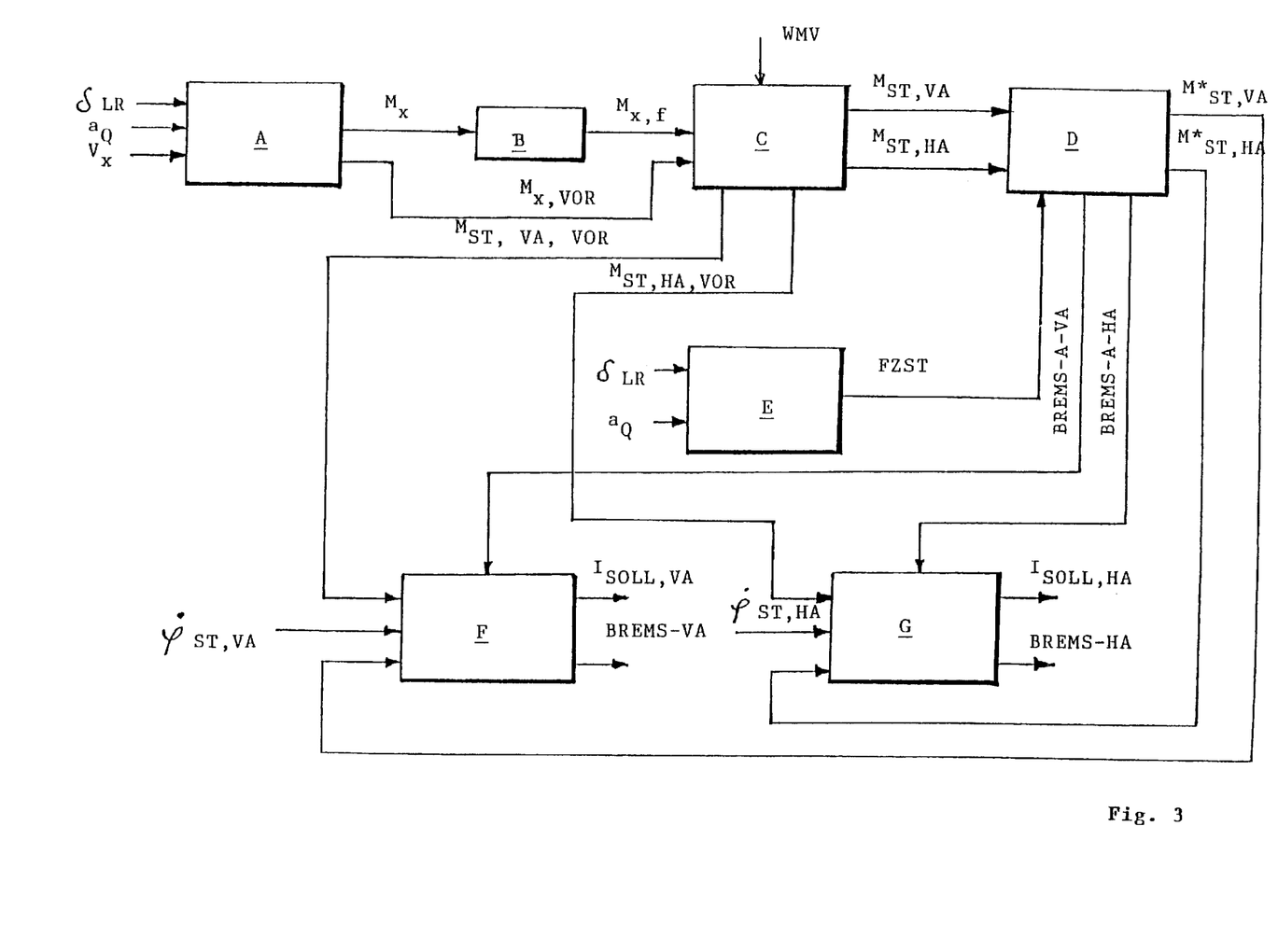
FIG. 3 shows a block diagram of the function structure for controlling the actuators on the front and rear axles of the roll stabilization system according to the present invention.

The block diagram in FIG. 3 shows a functional structure for controlling the actuators on the front and rear axles. In block A, torque $M_X$ on the vehicle body needed to support rolling is determined from the parameters steering wheel angle $\ddot{a}_{LR}$, transverse acceleration $a_Q$ and driving speed $V_X$ and low pass filtered in block B. In addition, a lead torque $M_{X,VOR}$ is determined in block A.

Torques $M_X$ and $M_{X,\,VOR}$ calculated with reference to the vehicle body are transformed to corresponding setpoint torques $M_{ST,\,VA}$, $M_{ST,\,HA}$, $M_{ST,\,VA,\,VOR}$ and $M_{ST,\,HA,\,VOR}$ on front and rear axles VA, HA, respectively (block C) by taking into account roll torque distribution WMV and the geometry. In block D, setpoint torques $M_{ST,\,VA}$ and $M_{ST,\,HA}$ are adjusted by taking the manipulated variable restriction into account, and holding brake(s) 7 is/are activated. Output quantities include modified actuating torques $M^*_{ST,\,VA}$ and $M^*_{ST,\,HA}$ as well as flags BREMS-A-VA and BREMS-A-HA for the brake control. In the event that brakes 7 on front and/or rear axles VA, HA are applied, $M^*_{ST,\,VA}$ and $M^*_{ST,\,HA}$ correspond to the total torque acting in the stabilizer, which is obtained from the active initial stress and the twist produced by the additional motion of the vehicle body. Block E determines from steering wheel angle $\ddot{a}_{LR}$ and transverse acceleration $a_Q$ whether a steady or non-steady driving state prevails at the moment, and this information is transferred via flag FZST to block D to control the holding brakes. In blocks F and G, setpoint currents $I_{soll,VA}$ and $I_{soll,HA}$ for the electric motors are determined from modified setpoint torques $M^*_{ST,VA}$ and $M^*_{ST,HA}$, lead torques $M_{ST,VA,\,VOR}$ and $M_{ST,HA,VOR}$ and angular velocities $_{-ST,VA}$ and $_{-ST,HA}$ of the actuating drives and are output to the front and rear axle actuating drives together with control signals $BREMS_{VA}$ and $BREMS_{HA}$ for brakes 7.

Figure 4A:
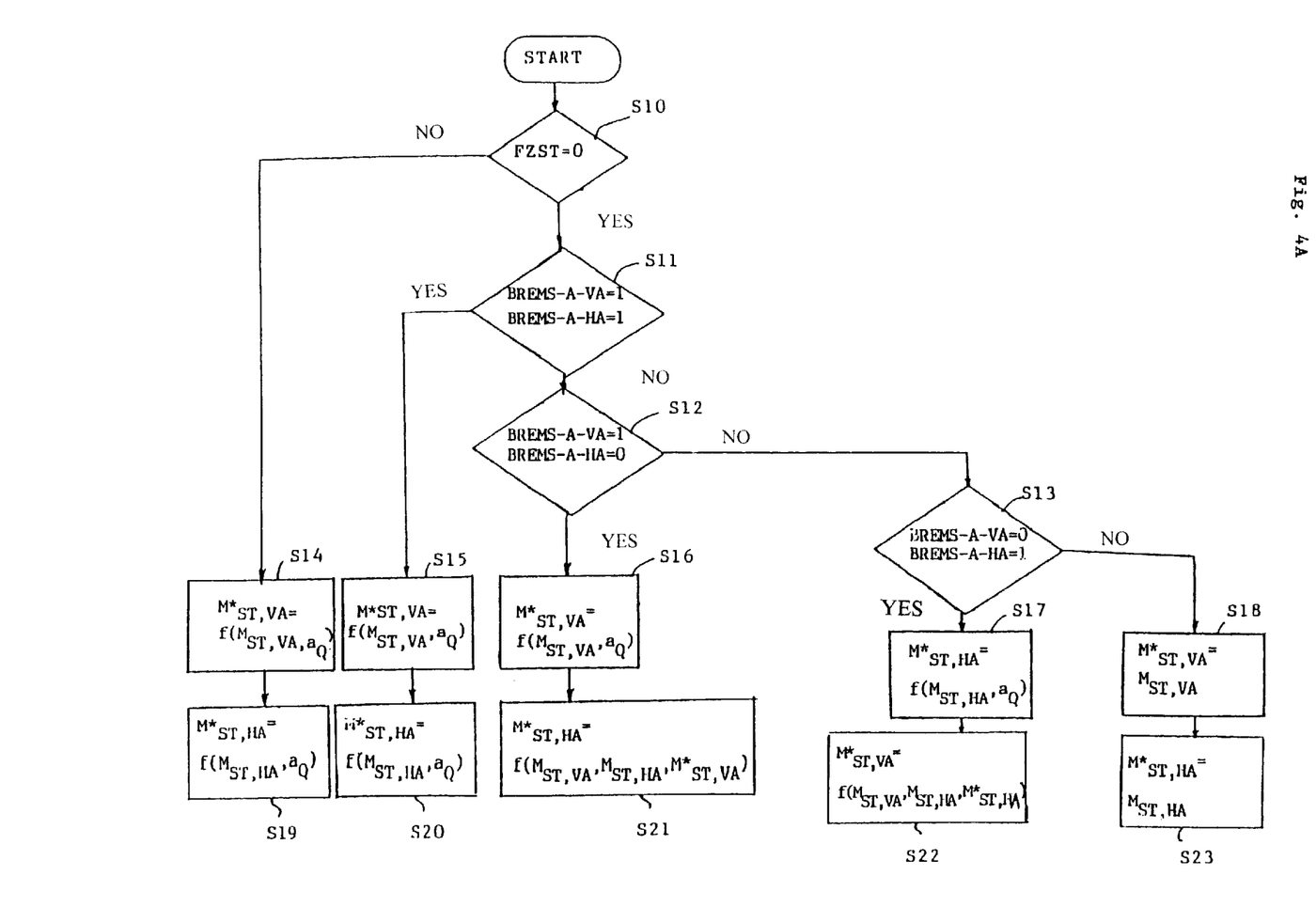
FIG. 4A shows a first flow chart that illustrates a design of function block D according to FIG. 3.
Figure 4B:
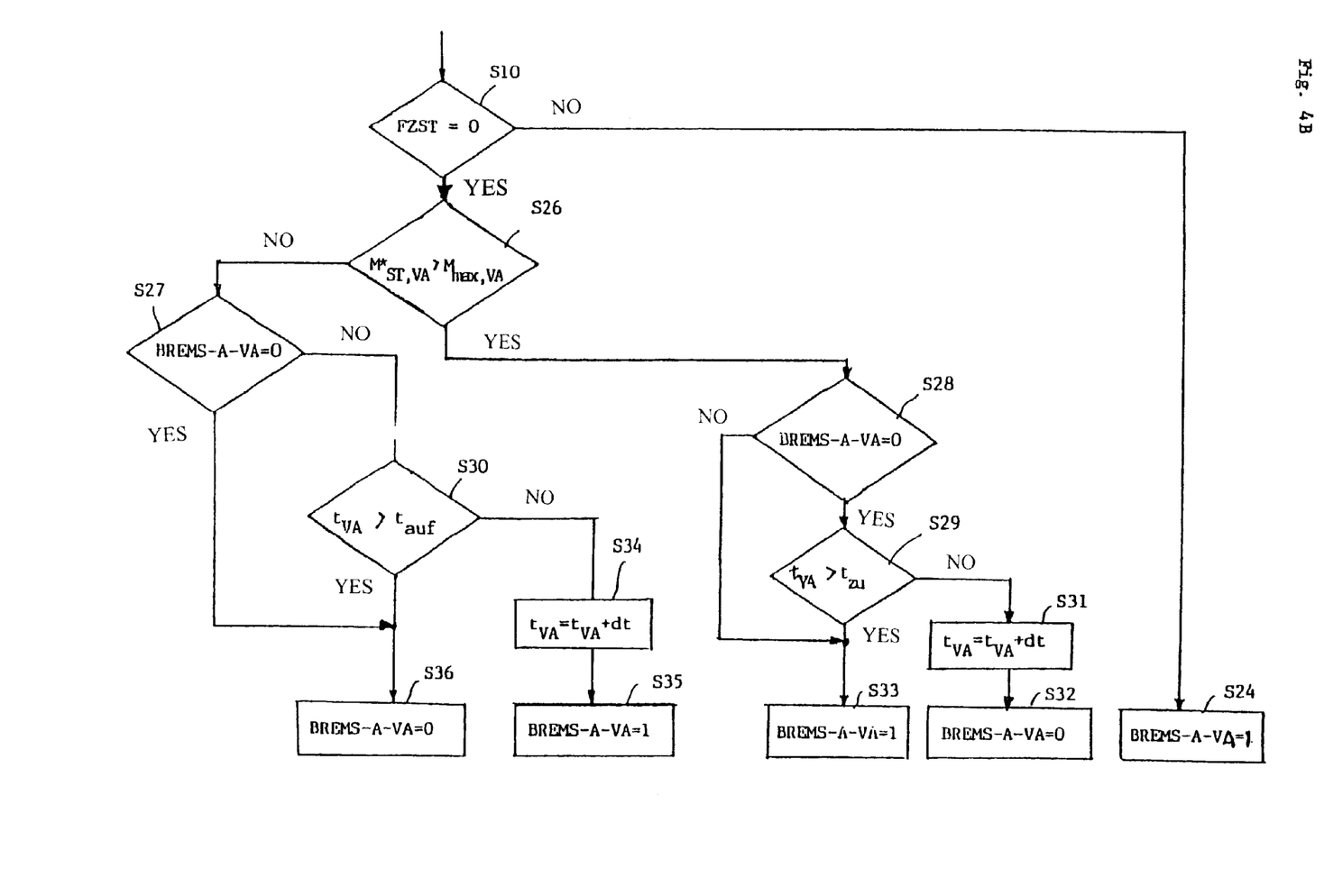
FIG. 4B shows a second flow chart that illustrates the design of function block D according to FIG. 3.
Figure 4C:
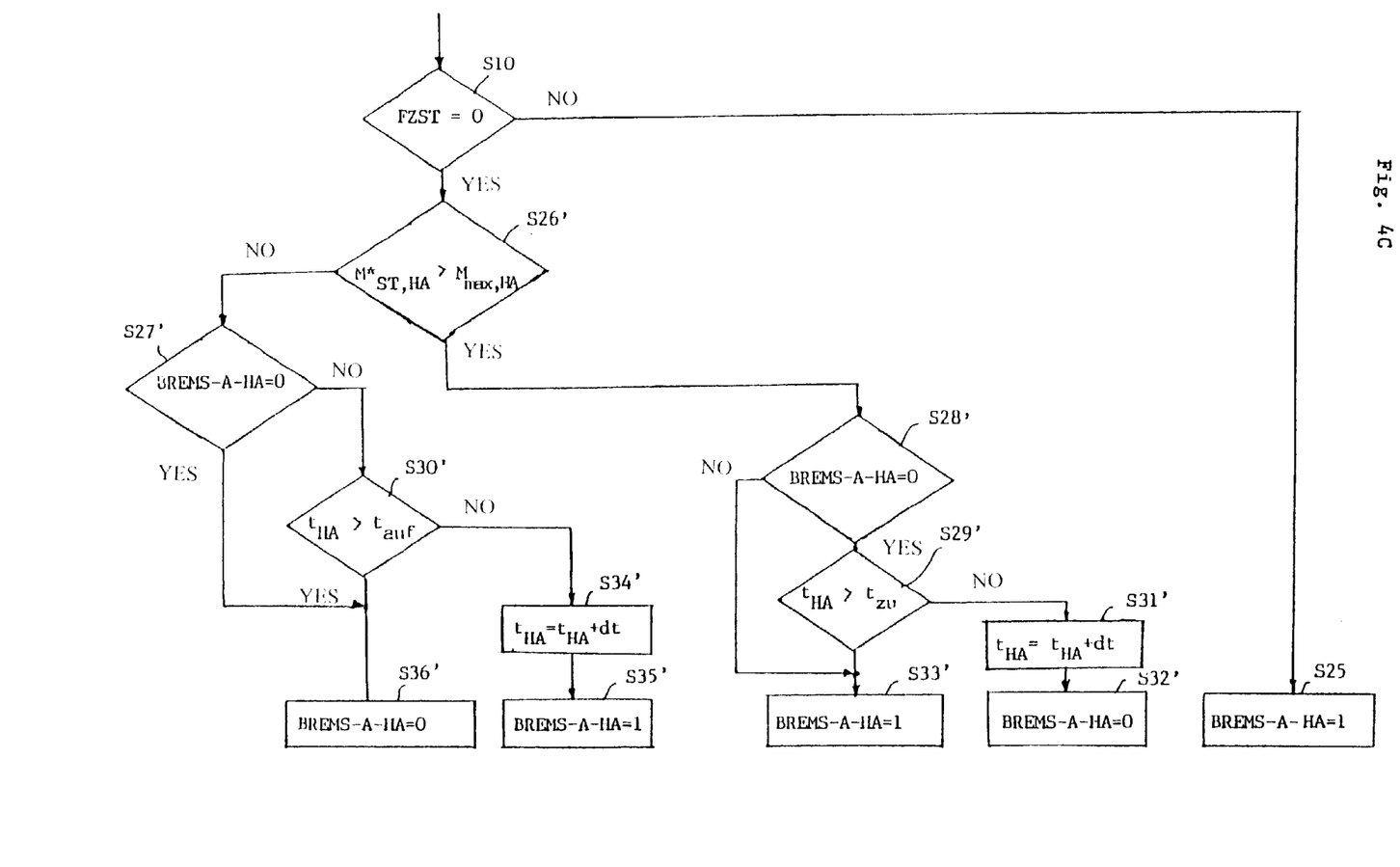
FIG. 4C shows a third flow chart that illustrates the design of function block D according to FIG. 3.

Function block D is described in greater detail below on the basis of flow charts (FIGS. 4A, 4B, 4C). The flags used have the following meanings:

FZST
=0: non-steady-state driving status
=1: steady-state driving status

BREMS-A-VA
=0: release holding brake VA or holding brake VA released
=1: apply holding brake VA or holding brake VA applied BREMS-A-HA
=0: release holding brake HA or holding brake HA released
=1: apply holding brake HA or holding brake HA applied The algorithm is divided into two sections. While modified output torques $M^*_{ST,VA}$ and $M^*_{ST,HA}$ are determined in the first part (FIG. 4A), flags BREMS-A-VA and BREMS-A-HA for the brake control are set as a function of $M^*_{ST,VA}$ and $M^*_{ST,HA}$ in the second section (FIGS. 4B and 4C).

First, there is an inquiry in step S10 to determine whether or not the driving state is a steady state. If it is a steady driving state, instantaneous torques $M^*_{ST,VA}$ and $M^*_{ST,HA}$, as well as measured transverse acceleration $a_Q$, are calculated regardless of the condition of brakes 7 (released—applied) (steps S14, S19), and flags BREMS-A-VA and BREMS-A-VA for front and rear axles VA, HA are set at 1 (steps S24, S25).

If there is a non-steady driving state (FZST=0), a check is performed in the first section (FIG. 4A, steps S11 through S13) to determine whether brakes 7 on front and/or rear axles VA, HA have already been applied, i.e., whether the flags are BREMS-A-VA=1 and/or BREMS-A-HA=1. If both brakes have been released, output torques $M^*_{ST,VA}$ and $M^*_{ST,HA}$ are equal to input torques $M_{ST,VA}$ and $M_{ST,HA}$ (steps S18, S23). If brakes 7 are applied on one or both axles VA, HA, i.e., BREMS-A-VA=1 and/or BREMS-A-HA=1, torque $M^*_{ST,VA}$ and $M^*_{ST,HA}$ on the respective axle is calculated from torque $M_{ST,VA}$ and $M_{ST,HA}$ and from measured transverse acceleration $a_Q$ (steps S15, S20). For example, if the brake on the front axle is applied and the brake on the rear axle is released, i.e., BREMS-A-VA=1 and BREMS-A-HA=0 (step 12), then output torque $M^*_{ST,HA}$ is determined from input torques $M_{ST,VA}$ and $M_{ST,HA}$ and from torque $M^*_{ST,VA}$ calculated previously (steps S16, S21). The desired rolling torque distribution is guaranteed in input torques $M_{ST,VA}$ and $M_{ST,HA}$. If the brake on the front axle is released and the brake on the rear axle is applied, i.e., BREMS-A-VA=0 and BREMS-A-HA=1 (step S13), the procedure is similar (S17 and S22):

Based on torques $M^*_{ST,VA}$ and $M^*_{ST,HA}$ determined in the first section (FIG. 4A), flags BREMS-A-VA and BREMS-A-HA for the brake control are set in the second section (FIGS. 4B, 4C). Since the algorithm for the front and rear axles is the same, it is sufficient here in this description to consider only the front axle.

FIG. 4B describes the function sequence for front axle VA, and FIG. 4C describes that for rear axle HA.

If there is no steady driving state (FZST=0) (step S110), first a query (step S26) determines whether instantaneous output torque $M^*_{ST,VA}$ is greater than maximum actuating torque $M^*_{max,VA}$. If not, a check is performed (step S27, 27') to determine whether brake 7 is applied or released. If the brake has been released, i.e., BREMS-A-VA=0, this is a "normal" control cycle where the actuating torque is received by electric motor 6. However, if brake 7 is applied, i.e., BREMS-A-VA=1, this means that required torque $M^*_{ST,VA}$ was previously outside the control range and was taken over by the brake. Only if torque $M^*_{ST,VA}$ is below maximum torque $M_{max,VA}$ for a defined period of time $t_{auf}$ (S30, 30') is flag BREMS-A-VA set at 0 to release brake 7 (S36, 36').

However, if instantaneous torque $M^*_{ST,VA}$ is greater than maximum actuating torque $M_{max,VA}$, a check is also performed to determine whether the brake is applied or released (S28, 28'). If the brake has been applied, i.e., BREMS-A-VA=1, this means that the torque has already been taken up by brake 7. However, if the brake has been released, i.e., BREMS-A-VA=0, then maximum actuating torque $M_{max,VA}$ has been exceeded. If required torque $M^*_{ST,VA}$ is above maximum torque $M_{ax,VA}$ for a certain period of time $t_{zu}$ (S29, 29'), flag BREMS-A-VA is set at 1 to apply the brake (S23, S23'). Time queries $t_{VA}>t_{auf}$ and $t_{VA}>t_{zu}$ should prevent the brake from being applied and released constantly in the event of minor fluctuations of $M^*_{ST,VA}$ about limit value $M_{max,VA}$.

Figure 4D:
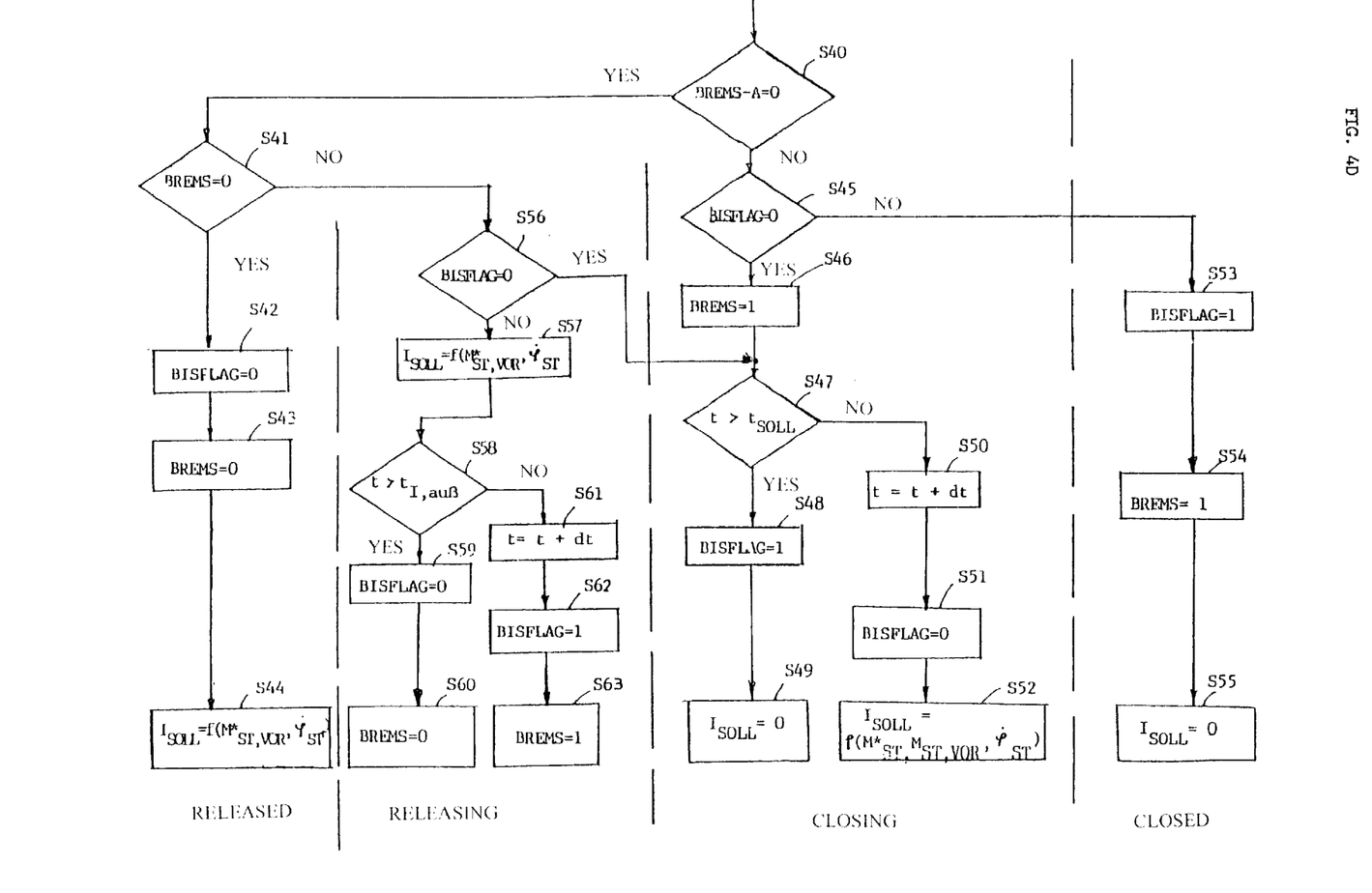
FIG. 4D illustrates in the form of a flow chart the sequence in function blocks F and G of FIG. 3.

Torques $M^*_{ST,VA}$ and $M^*_{ST,HA}$ and flags BREMS-A-VA and BREMS-A-HA are relayed to blocks F and G which in turn output the setpoint currents and control signals of the brakes to the front and rear axle actuators. FIG. 4D shows the flow chart of blocks F and G. Since the function for front and rear axles VA, HA is identical, there is no difference in indexing in the flow chart in FIG. 4D.

Control signal BREMS for the brake is set and setpoint current $I_{soll}$ is preset with time control. In comparison with flag BREMS-A, which corresponds to the "request" for applying or releasing the brake, BREMS represents the direct control signal for the brake, which is output as an analog or digital signal by the control unit.

The function block can be subdivided into four modes—RELEASED, RELEASING, APPLYING, APPLIED. The RELEASED mode corresponds to the "normal" control cycle, i.e., BREMS-A=0 and BREMS=0 (steps S40, S41, S42, S43, S44). Setpoint current $I_{soll}$ is obtained as a function of $M^*_{ST,VOR}$ and $_{13\ ST}$. If flag BREMS-A is set at 1 starting from 0, the system switches to the APPLYING mode and control signal BREMS=1 is output (S46). Setpoint current $I_{soll}$ is determined for a specified period of time $t_{schl}$ according to the "normal" control cycle (S50–S53), with time $t_{schl}$ being selected as a function of the closing time of the brake. For $t>t_{schl}$ (S47), setpoint current $I_{soll}=0$ is set (S48, S49) and the mode is switched to APPLIED (S53, S55). The torque in the stabilizer is now taken up completely by brake 7. If flag BREMS-A is set at 0 starting from 1 (S41), the mode changes to RELEASING and the setpoint is run up from 0 to the instantaneous current according to the "normal" control cycle. For a specified period of time $t_{I,autb}$ (S58), the brake is kept closed (S61–S63). Then the brake is applied, i.e., BREMS=0 (S60) is output for $t>t_{I,autb}$ (S58). Time $t_{I,autb}$ corresponds to the time required for the current to build up and thus for the applied torque to be taken up again by electric motor 6. Then the mode changes to RELEASED.

The system according to the present invention for roll stabilization of vehicles can also be used, as mentioned above, for manually or automatically defined inclination of the vehicle body when the vehicle is parked, for leveling the vehicle about its longitudinal axis and for additional intervention in the positioning system of the chassis of the vehicle and thus its body. Vehicles parked on an inclined roadway surface, for example, can thus be leveled manually or automatically by supplying appropriate power to the slewing drives and then locking by applying the brakes. Assistance in entering and leaving the vehicle can be achieved by a defined inclination of the vehicle body of a parked vehicle with the help of the roll stabilization system according to the present invention, and thus the doors can be opened and closed more easily. Likewise, a luggage rack or a loading area can be loaded more easily by inclining the vehicle body of a parked vehicle at a defined inclination by supplying a defined power to the slewing drives and then locking the position by applying the brakes. Finally, individual wheels can also be lifted in a defined manner by diagonally displacing the slewing drives and then locking the position by applying the brakes, e.g., for changing a tire, and the body can be inclined at a defined angle for easy accessibility from beneath, e.g., for repair work.

What is claimed is:

1. A system for providing a roll stabilization of a vehicle that includes an an actuating arrangement, comprising:
   at least one sensor for detecting a roll parameter;
   a front chassis stabilizer;
   a rear chassis stabilizer; and
   at least one slewing drive arranged between halves of at least one of the front chassis stabilizer and the rear chassis stabilizer, the at least one slewing drive producing an initial stress of the halves of the at least one of the front chassis stabilizer and the rear chassis stabilizer to achieve one of a reduction and a suppression of a rolling motion, and the at least one slewing drive, in the event of a roll, applying a force to at least one of the halves of the at least one of the front chassis stabilizer and the rear chassis stabilizer as a function of output signals of the at least one sensor, wherein:
   the at least one slewing drive is an electromechanical slewing drive, and
   the at least one slewing drive includes an arrangement for locking a swiveling of the halves of the at least one of the front chassis stabilizer and the rear chassis stabilizer with respect to one another.

2. The system according to claim 1, wherein:
the vehicle corresponds to a motor vehicle.

3. The system according to claim 2, further comprising:
a brake-clutch combination.

4. The system according to claim 1, wherein:
the at least one slewing drive includes a plurality of slewing drives,
each slewing drive includes a slewing motor and a step-down gear, and
the arrangement for locking includes for each slewing drive a respective brake that is actuated according to one of an electromagnetic application and an electromagnetic release brake and that is arranged between the slewing motor and the step-down gear of a respective one of each slewing drive.

5. The system according to claim 4, further comprising:
an arrangement associated with each brake for locking each electromechanical slewing drive on a front axle and a rear axle only in a neutral middle position in the event of a system failure.

6. The system according to claim 5, further comprising:
an electronic control unit connected to the at least one sensor, each electromechanical slewing drive, and each brake of each electromechanical slewing drive and for generating control signals for each electromechanical slewing drive and the brake of the front axle and the brake of the rear axle.

7. The system according to claim 1, wherein the electromechanical slewing drive includes an electric slewing motor and a step-down gear, the system further comprising:
a clutch arranged between a drive side and an output side of the electromechanical slewing drive so that at least one of the electric slewing motor, the step-down gear, and individual gear stages thereof are capable of being separated from the output side of the electromechanical slewing drive.

8. The system according to claim 1, wherein:
the at least one sensor includes a transverse acceleration sensor.

9. The system according to claim 1, wherein:
the at least one sensor includes a sensor for determining a steering wheel angle and a sensor for determining a vehicle speed.

10. The system according to claim 1, wherein:
one of a manual leveling and an automatic leveling of the vehicle is achieved about a longitudinal axis of the vehicle when standing still,
each slewing drive receives an electric current according to a position of the vehicle, the position of the vehicle corresponding to one of an inclination, a location on a curb on one side, and a position in which the vehicle is standing with one wheel in a recess, until a horizontal position of the vehicle is reached, and
after the horizontal position is reached, the horizontal position is locked by applying the brakes.

11. The system according to claim 1, wherein:
one of a manual inclining and an automatic inclining of the body of the vehicle is achieved about a defined angle,
after an angle of inclination is preset, each slewing drive receives an electric current, and
an inclined position of the body of the vehicle is locked by applying brakes.

12. The system according to claim 1, wherein:
one of a manual lifting and an automatic lifting of individual wheels of the vehicle standing still is achieved,
a wheel to be lifted is preset, each slewing drive receiving an electric current such that the halves of the at least one of the front chassis stabilizer and the rear chassis stabilizer are displaced diagonally at a position, and
the position is locked by applying brakes.

13. A method for providing a roll stabilization of a vehicle, comprising the steps of:
determining a maximum settable torque from parameters including a maximum motor torque of an electric slewing motor, a gear reduction, an efficiency, and a torque loss;
determining a required actuating torque;
releasing a brake and applying a torque force to a low-torque end of the electric slewing motor when the required actuating torque is below a maximum actuating torque;
applying the brake when the required actuating torque exceeds the maximum actuating torque of an electric slewing drive; and
generating setpoint currents for the electric slewing motor to generate a counter-torque for the roll stabilization.

14. The method according to claim 13, wherein:
the vehicle corresponds to a motor vehicle.

15. The method according to claim 13, further comprising the steps of:
determining a steering wheel angle;
determining a transverse acceleration; and
determining a driving speed, wherein the step of determining the required actuating torque includes the step of determining the required actuating torque from the determined steering wheel angle, the determined transverse acceleration, and the determined driving speed.

16. The method according to claim 15, wherein:
the step of determining the required actuating torque includes the step of determining a lead torque.

17. The method according to claim 16, further comprising the step of:
converting the required actuating torque and the lead torque relative to a body of the vehicle to corresponding setpoint torques of an actuator arranged on a front axle and a rear axle on the basis of a rolling torque distribution and geometric relationships.

18. The method according to claim 17, further comprising the steps of:
adjusting the corresponding setpoint torques on the basis of a manipulated variable restriction;
determining an instantaneous driving state corresponding to one of a steady state and a non-steady state on the basis of the determined steering wheel angle and the determined transverse acceleration; and
generating brake control signals for each one of the step of releasing the brake and applying the torque force and for the step of applying the brake on the basis of the adjusted corresponding setpoint torques and the instantaneous driving state.

19. The method according to claim 18, further comprising the steps of:
determining the generated setpoint currents from the adjusted corresponding setpoint torques, the lead torque, and angular velocities; and
outputting the generated setpoint currents together with the brake control signals.

* * * * *